UNITED STATES PATENT OFFICE.

HOWARD F. CHAPPELL, OF NEW YORK, N. Y.

UTILIZATION OF NATIVE ALUNITE.

1,336,508.      Specification of Letters Patent.      Patented Apr. 13, 1920.

No Drawing.      Application filed June 11, 1918. Serial No. 239,406.

*To all whom it may concern:*

Be it known that I, HOWARD F. CHAPPELL, a citizen of the United States, residing at New York city, in the county of New York, State of New York, have invented certain new and useful Improvements in the Utilization of Native Alunite; and I do hereby declare the following to be a full, clear, and exact description of the invention, such as will enable others skilled in the art to which it appertains to make and use the same.

The present invention relates to the economic utilization of crude alunite, that is to say, native alunite as mined, in admixture with the native rock or rhyolite associated with it in the regional deposit.

It has been customary, heretofore, in the utilization of alunite to subject it to a calcining operation, having for its main purpose the driving off of sulfur in the form of oxid of sulfur gases and to render the calcined alunite insoluble, so that the potassium compounds contained therein might be leached out and recovered as a marketable product, and the leached calcined alunite utilized in the manufacture of refractories, the production of aluminum nitrid, the manufacture of metallic aluminum, and the like.

The procedure of the present invention, however, presents another method for the utilization of native alunite which is peculiarly appropriate to the remote regions in which it is found, because of the vicinity of metallurgical plants, which, in their normal operations, produce large quantities of sulfuric acid, to wit,—plants for the smelting of copper sulfids. Relatively short distances separate the locus of the alunite deposits from these copper smelting plants, so that it is feasible to make use of the sulfuric acid in the treatment of the native alunite without encountering the difficulty of prohibitive freight rates, and also to the advantage of the copper smelting plants which have thus at hand a suitable and remunerative outlet for their sulfuric acid which is usually far in excess of local demand and cannot be ordinarily shipped to distant points to advantage.

In carrying out the invention, the native alunite, containing more or less rhyolite (which it is usually not worth while to attempt to separate except roughly) is appropriately crushed, after mining, and is then subjected to the action of sulfuric acid, say by supplying the crushed native alunite to a vessel wherein it is agitated in the presence of a bath of sulfuric acid of such quantity and strength as to dissolve out the aluminum compounds. For this purpose it will be convenient to use sulfuric acid (suitably diluted) from any suitable source as, for instance, contact acid or chamber acid. Or, the crude native alunite may be first moistened with strong sulfuric acid, then heated, and finally leached with water to dissolve out the aluminum compounds. With the aluminum compounds, the potassium compounds likewise go into solution and also certain of the impurities present, as, for instance, a certain proportion of the iron. The iron present may then be precipitated out by ferrocyanid of potassium, or otherwise. The solution is then filtered off, leaving as a residue the native rock or rhyolite. A sufficient quantity of ammonia is then admitted to the solution, in any convenient form, as, for instance, in the gaseous state or dissolved in water; whereupon aluminum hydrate is precipitated in a correspondingly pure condition.

The solution, after the addition of the ammonia, contains sulfate of ammonia and sulfate of potassium, which may then be recovered in solid form, suitable for shipment, as for use as a fertilizer, or, if preferred, the sulfates may be separated from each other for individual use.

It will be noted that, by the use of the process described, the operator is enabled to obtain as commercial products, of high value, a fertilizing agent, in such concentrated form that it can be shipped to advantage, not only as to convenience of handling and packing, but also as to car space, freight rates, and the like, and also a purified form of alumina, which, after dehydration, is likewise available for economic transportation to distant points and which, by reason of its high grade, is particularly utilizable for all of the purposes which make a pure form of alumina desirable in the arts,—especially, as above noted, in the manufacture of metallic aluminum.

What I claim is:

1. The method of utilizing crude alunite to recover alumina and potassium salts therefrom, which consists in treating the native alunite with dilute sulfuric acid to dissolve out the aluminum and potassium compounds present in alunite, then precipitating out the iron with a cyanid, then adding ammonia to the solution so as to precipitate aluminum hydrate, then separating the precipitated hydrate from the soluble potassium and ammonium salts, then calcining the hydrate to give alumina, and recovering the potassium and ammonium salts in a solid form.

2. The method of utilizing crude alunite to recover alumina and potassium salts therefrom, which consists in treating the native alunite with dilute sulfuric acid to dissolve out the aluminum and potassium compounds present in the alunite, then adding ammonia to the solution to precipitate aluminum hydrate, then separating the precipitated hydrate from the soluble potassium and ammonium salts.

In testimony whereof I affix my signature.

HOWARD F. CHAPPELL.